US009251008B2

(12) United States Patent
Anglin (10) Patent No.: US 9,251,008 B2
(45) Date of Patent: Feb. 2, 2016

(54) CLIENT OBJECT REPLICATION BETWEEN A FIRST BACKUP SERVER AND A SECOND BACKUP SERVER

(71) Applicant: International Business Machines Corporation, Armonk, NY (US)

(72) Inventor: Matthew J. Anglin, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 194 days.

(21) Appl. No.: 13/828,435

(22) Filed: Mar. 14, 2013

(65) Prior Publication Data

US 2014/0279912 A1   Sep. 18, 2014

(51) Int. Cl.
*G06F 17/30* (2006.01)
*G06F 11/14* (2006.01)

(52) U.S. Cl.
CPC .................. *G06F 11/1448* (2013.01)

(58) Field of Classification Search
USPC ................................................. 707/640–661
See application file for complete search history.

(56) References Cited

U.S. PATENT DOCUMENTS

| | | | | |
|---|---|---|---|---|
| 6,463,454 | B1* | 10/2002 | Lumelsky | G06F 9/5083 707/E17.12 |
| 7,069,402 | B2 | 6/2006 | Coulter et al. | |
| 7,519,785 | B1* | 4/2009 | Schultz | G06F 11/2094 711/162 |
| 7,657,578 | B1* | 2/2010 | Karr | G06F 11/2069 707/610 |
| 7,761,456 | B1* | 7/2010 | Cram et al. | 707/754 |
| 7,769,722 | B1* | 8/2010 | Bergant et al. | 707/681 |
| 7,873,599 | B2* | 1/2011 | Ishii et al. | 707/640 |
| 7,917,469 | B2* | 3/2011 | Bernhard et al. | 707/610 |
| 7,979,546 | B2* | 7/2011 | Hamel et al. | 709/225 |
| 7,987,158 | B2* | 7/2011 | Boyd et al. | 707/649 |
| 8,010,505 | B2* | 8/2011 | Kushwah | 707/679 |
| 8,055,745 | B2 | 11/2011 | Atluri | |
| 8,112,423 | B2* | 2/2012 | Bernhard et al. | 707/737 |
| 8,131,669 | B2* | 3/2012 | Cannon | G06F 11/1451 707/609 |
| 8,438,136 | B2* | 5/2013 | Ohr et al. | 707/661 |
| 8,700,567 | B2* | 4/2014 | Watanabe et al. | 707/610 |
| 8,812,450 | B1* | 8/2014 | Kesavan et al. | 707/656 |

(Continued)

OTHER PUBLICATIONS

Wang et al., "Hadoop High Availability through Metadata Replication," CloudDB'09, Nov. 2, 2009, Hong Kong, China, pp. 37-44.

(Continued)

*Primary Examiner* — Hanh Thai
(74) *Attorney, Agent, or Firm* — David W. Victor; Konrad Raynes Davda & Victor LLP (57) ABSTRACT

Provided are a computer program product, system, and method for client object replication between a first backup server and a second backup server. Objects are backed-up from a client to a first backup server. The first backup server generates metadata on the objects from the client and transmits the metadata to a second backup server, wherein the objects backed-up at the first backup server are not copied to the second backup server. A determination is made that the first backup server is unavailable after transmitting the metadata. The metadata at the second backup server is used to determine modifications to the objects at the client since the metadata was last generated in response to determining that the first backup server is unavailable. The client backs-up the determined modifications to the objects to the second backup server to backup.

20 Claims, 6 Drawing Sheets

(56) References Cited

U.S. PATENT DOCUMENTS

| | | | |
|---|---|---|---|
| 2007/0050415 A1* | 3/2007 | Armangau | G06F 3/0605 1/1 |
| 2007/0078978 A1* | 4/2007 | Arnold | H04L 47/10 709/224 |
| 2007/0094312 A1 | 4/2007 | Sim-Tang | |
| 2007/0118576 A1 | 5/2007 | Moore et al. | |
| 2007/0118577 A1 | 5/2007 | East | |
| 2007/0180302 A1* | 8/2007 | Allen et al. | 714/6 |
| 2008/0059941 A1* | 3/2008 | Payne et al. | 717/100 |
| 2009/0006888 A1* | 1/2009 | Bernhard et al. | 714/6 |
| 2010/0161551 A1* | 6/2010 | Whynot | G06F 11/2094 707/610 |
| 2011/0178983 A1* | 7/2011 | Bernhard et al. | 707/610 |
| 2011/0196828 A1 | 8/2011 | Drobychev et al. | |
| 2012/0054155 A1* | 3/2012 | Darcy | G06F 11/2094 707/654 |
| 2012/0136829 A1* | 5/2012 | Darcy | G06F 17/30575 707/626 |
| 2013/0054524 A1* | 2/2013 | Anglin et al. | 707/624 |

OTHER PUBLICATIONS

"Perforce 2010.1: System Administrator's Guide, Chapter 10, Perforce Replication," Perforce Software, Oct. 2012, downloaded from Internet on Jan. 22, 2012 at http://www.perforce.com/perforce/doc.current/manuals/p4sag/10_replication.html#1056059, pp. 1-8.

"Perforce 2012.2 System Administrators Guide", dated Oct. 2012, pp. 1-230.

\* cited by examiner

FIG. 1

Metadata Record

FIG. 2

Replication Command

CLIENT OBJECT REPLICATION BETWEEN A FIRST BACKUP SERVER AND A SECOND BACKUP SERVER

BACKGROUND OF THE INVENTION

1. Field of the Invention

The present invention relates to a computer program product, system, and method for client object replication between a first backup server and a second backup server.

2. Description of the Related Art

In a data protection environment, the goal is to protect client data and backup the data on a regular basis. In a client/server backup model, the client comprises an application or host system that backs-up its data to a server or backup server. As part of a backup data protection scheme, the backup server maintains an inventory of the files contained on the client. After the initial backup operation, during a subsequent backup, also referred to as an "incremental backup", the client queries the backup server for its view of the inventory, and compares the sever view of the inventory with the client view of the inventory, i.e., client file system. Files which are new or changed on the client are selected for backup, and files which have been deleted from the client are selected for deletion on the server. Each incremental backup cycle performs this comparison to determine the work to perform.

Traditional incremental backup obtains the list of backup and expiration candidates by building comprehensive lists of local objects, and lists of active server objects for the file system being backed-up. The local lists are obtained by scanning the local file system. The server list is obtained by querying the corresponding server inventory for all active objects. The lists may indicate objects in a directory of the file system, partition, or other logical partition of the data. The two lists are compared, and candidates are selected according to the following criteria. An object is selected as a backup candidate if it exists in the local list, but does not exist in the server list. The object is also a backup candidate if it exists in both lists, but differs according to incremental criteria (for example, attribute changes, date and size changes). An object is selected as an expiration candidate if it exists in the server list, but does not exist in the local list.

Journal-based backup obtains the candidates list of objects to backup and expire by querying a journal service for the contents of the change journal of the file system being backed up. Change journal entries are cleared (marked as free) after they have been processed by the backup client and committed on the backup server. Journal-based backup is activated by configuring the journal service to monitor specified file systems for change activity. A Journal Based Backup (JBB) technique can avoid the incremental comparison for each cycle.

Another data protection technique is clustering, where two servers are used to provide high availability. Clustered servers may be in close proximity and may distribute the tasks over machines in the cluster to prevent hardware or software failures on a member machine from making a service unavailable. For example, a basic cluster might consist of two systems each running its own workload, but capable of taking on the workload of the other machine, should the other machine fail. In many clustering environments, the application and its data is made highly available, but the data itself may not be duplicated. In other words, in most cases, clustering helps achieve high availability of the application if a single machine goes down, or a network link is lost.

A yet further data protection scheme is replication. Replication makes copies of the data itself and creates a catalog or inventory of the data

SUMMARY

Provided are a computer program product, system, and method for client object replication between a first backup server and a second backup server. Objects are backed-up from a client to a first backup server. The first backup server generates metadata on the objects from the client and transmits the metadata to a second backup server, wherein the objects backed-up at the first backup server are not copied to the second backup server. A determination is made that the first backup server is unavailable after transmitting the metadata. The metadata at the second backup server is used to determine modifications to the objects at the client since the metadata was last generated in response to determining that the first backup server is unavailable. The client backs-up the determined modifications to the objects to the second backup server to backup.

DETAILED DESCRIPTION

Described embodiments provide techniques to backup client objects at a first backup server and second backup server to provide redundancy in case the first backup server becomes unavailable. In described embodiments, the client backs-up objects and metadata of the objects at the first backup server and the first backup server replicates metadata-only without the objects to the second backup server. If the first backup server becomes unavailable, then the client backs-up modified objects since the first backup server went down and information on modified objects, e.g., changed, added or deleted, to the second backup server. When the first backup server becomes available again, the second backup server replicates to the first backup server all the client objects and metadata received from the client while the first backup server was unavailable.

Described embodiments provide backup server redundancy with fast completion of the secondary backup by having the primary or first backup server replicate metadata only without replicating the objects to the secondary backup server. Replicating metadata only from the first backup server to the second backup server is faster and conserves bandwidth, especially for clients having a substantial amount of data to replicate. Further, bandwidth is conserved at the client because the client may only backup incremental changes to the second backup server after the first backup server is unavailable, thus avoiding the need to backup all client data to the second backup server.

Figure 1:
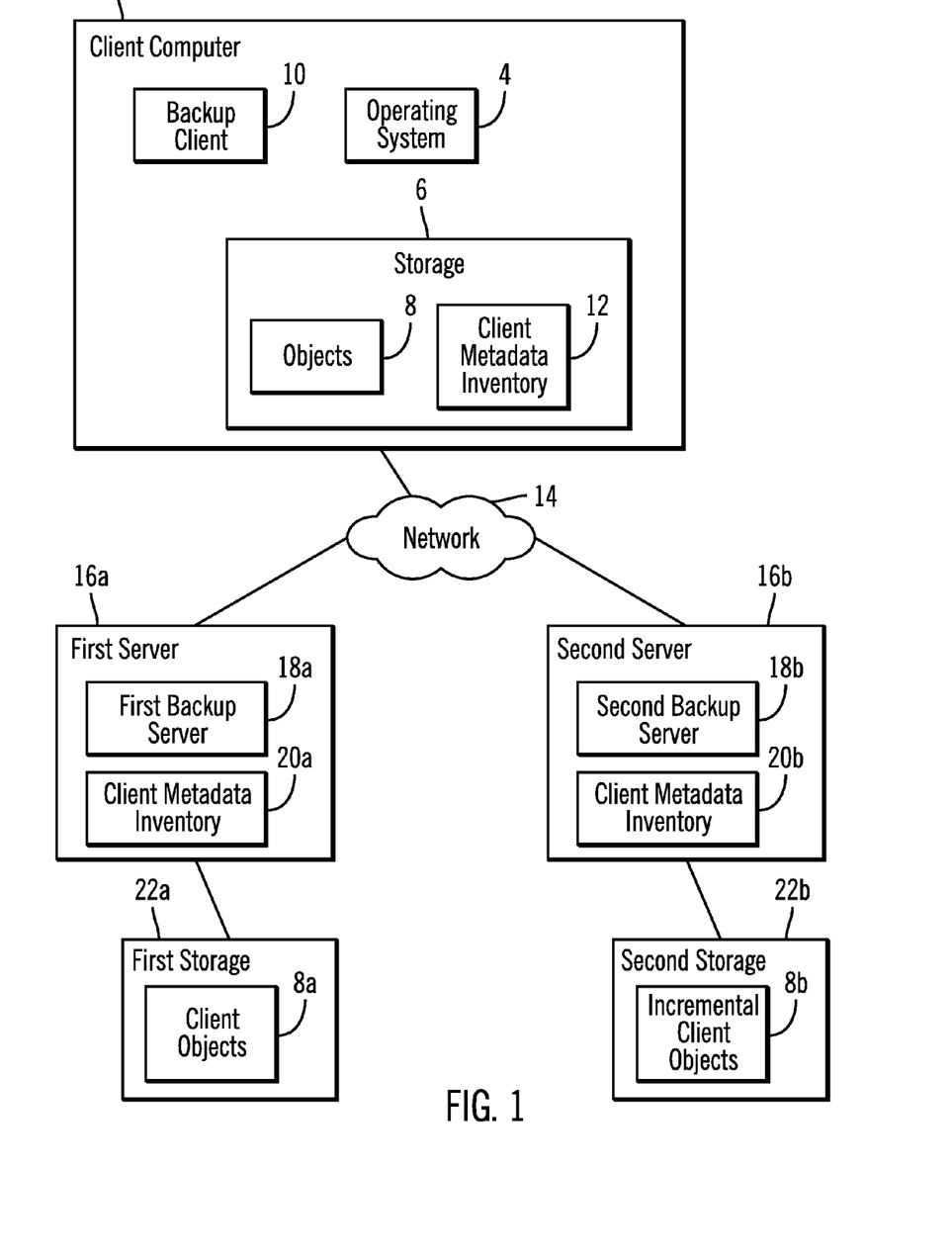
FIG. 1 illustrates an embodiment of a backup computing environment.

FIG. 1 illustrates an embodiment of a network replication environment. A client computer 2 comprises a computer system including an operating system 4, and a storage 6. The storage 6 includes objects 8 at the client 2, such as files in a file system, drivers, library files, programs, program data, databases, and data used by the client 2. The client 2 may further include a backup client 10 that generates a client metadata inventory 12 having metadata or metadata records for the client object and manages backup operations for the client 2. There may be multiple client computers 2 in a network 14.

The client computers 2 communicate with a first server 16a and a second server 16b over the network 14. The servers 16a and 16b include instances of the client metadata inventory 18a and 18b, respectively, to manage the backing up of the client objects 8. In one embodiment, the first backup server 18a provides a complete backup of all client objects 8 and maintains a backup of the client objects as client objects 8a and metadata records 50 for each of the client objects 8a in the client metadata inventory 20a. The first backup server 18a may replicate its instance of the client metadata inventory 20a to the second backup server 18b to store as client metadata inventory 18b without also backing up the client objects 8a. If the first backup server 18a becomes unavailable, then the backup client 10 may copy modifications to the objects 8, such as new and added objects 8, to the second backup server 18b to backup as incremental client objects 8b while the first backup server 18a is unavailable. The first backup server 18a may maintain a full backup of all client objects 8 as client objects 8a, while the second backup server 18b may maintain only incremental client objects 8b comprising those client objects 8 that have been added or modified while the first backup server 18a or the first storage 22a is unavailable.

In certain embodiments, the client 10 may continue to use the second backup server 18b even after the first backup server 18a is available until the changes are replicated back from the second backup server 18b to the first backup server 18a. Until the first backup server 18a is synchronized with the changes from the second backup server 18b, the second backup server 18b has the more up-to-date inventory 10b, and should be used by the client 10 to minimize data transfer.

The first backup server 18a may be unavailable due to network 14 problems, problems or maintenance at the first server 16a on which the first backup server 18a runs or problems or maintenance with the first backup server 18a.

With described embodiments, the first backup server 18 does not need to replicate client objects to the second backup server 18b, but only the metadata records for the client objects 8a. This metadata-only replication provides a much faster replication than having to replicate all the actual client objects 8a replicated to the first backup server 18a.

The client computers 2 and servers 16a, 16b may comprise suitable computational devices known in the art, such as servers, desktop computers, workstations, mainframes, hand held computing devices, telephony devices, etc. The client 2 and servers 16a, 16b may be implemented on a physical computer or on a virtual machine.

The storages 6, 22a, 22b may comprise one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, solid state storage devices (SSDs), storage-class memory (SCM)), electronic memory, magnetic tape media, tape cartridges, etc.

The network 14 may comprise a Wide Area Network (WAN), Local Area Network (LAN), Storage Area Network (SAN), wireless network, the Internet, an Intranet, peer-to-peer network, etc. The client metadata inventory 12, 18a, 18b may comprise a relational database or other suitable database known in the art for storing records of information.

The backup client 10 and backup servers 18a, 18b may comprise programs provided with a client-server backup architecture known in the art. The backup client 10 and backup servers 18a, 18b may be implemented as software executed by a processor, a hardware device, such as an Application Specific Integrated Circuit (ASIC) or a combination of hardware and software. FIG. 1 shows the backup client 10 and backup servers 18a, 18b implemented on different computing platforms 2, 16a, 16b. In alternative embodiments, the components 10, 18a, 18b may be implemented in one or fewer systems than shown, or distributed across more than three as shown systems.

Figure 2:
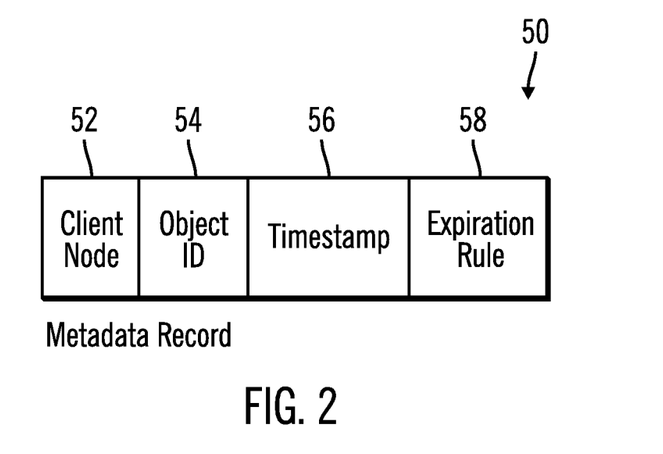
FIG. 2 illustrates an embodiment of a metadata record.

FIG. 2 illustrates an embodiment of a metadata record 50 included in the metadata inventories 12, 20a, 20b for one of the client objects 8, 8a, 8b. The metadata records 50 forming the metadata inventories 12, 20a, and 20b may be stored with the objects 8, 8a, 8b they represent or external to the objects. A metadata record may include: client information 52 identifying the client computer 2 from which the file originated; an object ID 54 identifying the object at the client 2; a timestamp 56 for when the object 54 was created or last modified; an expiration rule 58 indicating when the object should be expired or whether the object is currently expired and eligible for deletion.

Figure 3:
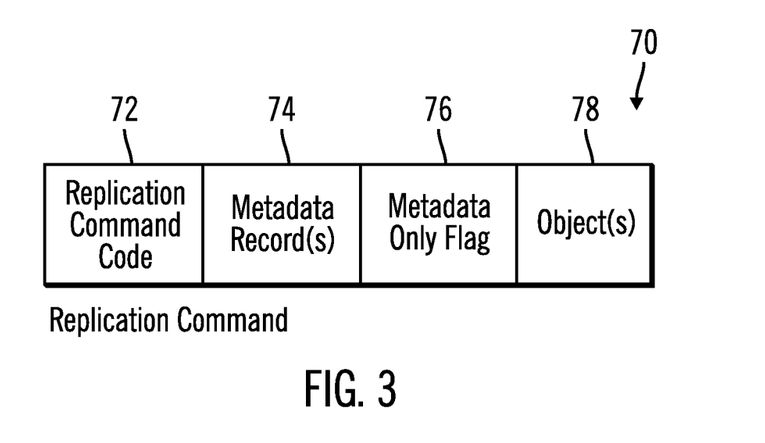
FIG. 3 illustrates an embodiment of a replication command.

FIG. 3 illustrates an embodiment of a replication command 70 sent by the first backup server 18a to replicate only object metadata at the second backup server 18b. The replication command 70 includes a replication command field 72 code; one or more metadata records 74 comprising metadata records 50; a metadata-only flag 76 indicating whether the data of the objects represented by the provided metadata records 74 are included with the transmission or the replication is for only metadata. If the flag 76 indicates that no objects are included, then the replication command comprises a metadata-only replication command in that only metadata is being replicated, not the object data. If the metadata only flag 76 indicates that the replication does include objects, then objects 78 are transmitted with the replication command.

The backup client 10 would send backup commands to backup metadata and objects to the backup servers 18a, 18b.

Figure 4:
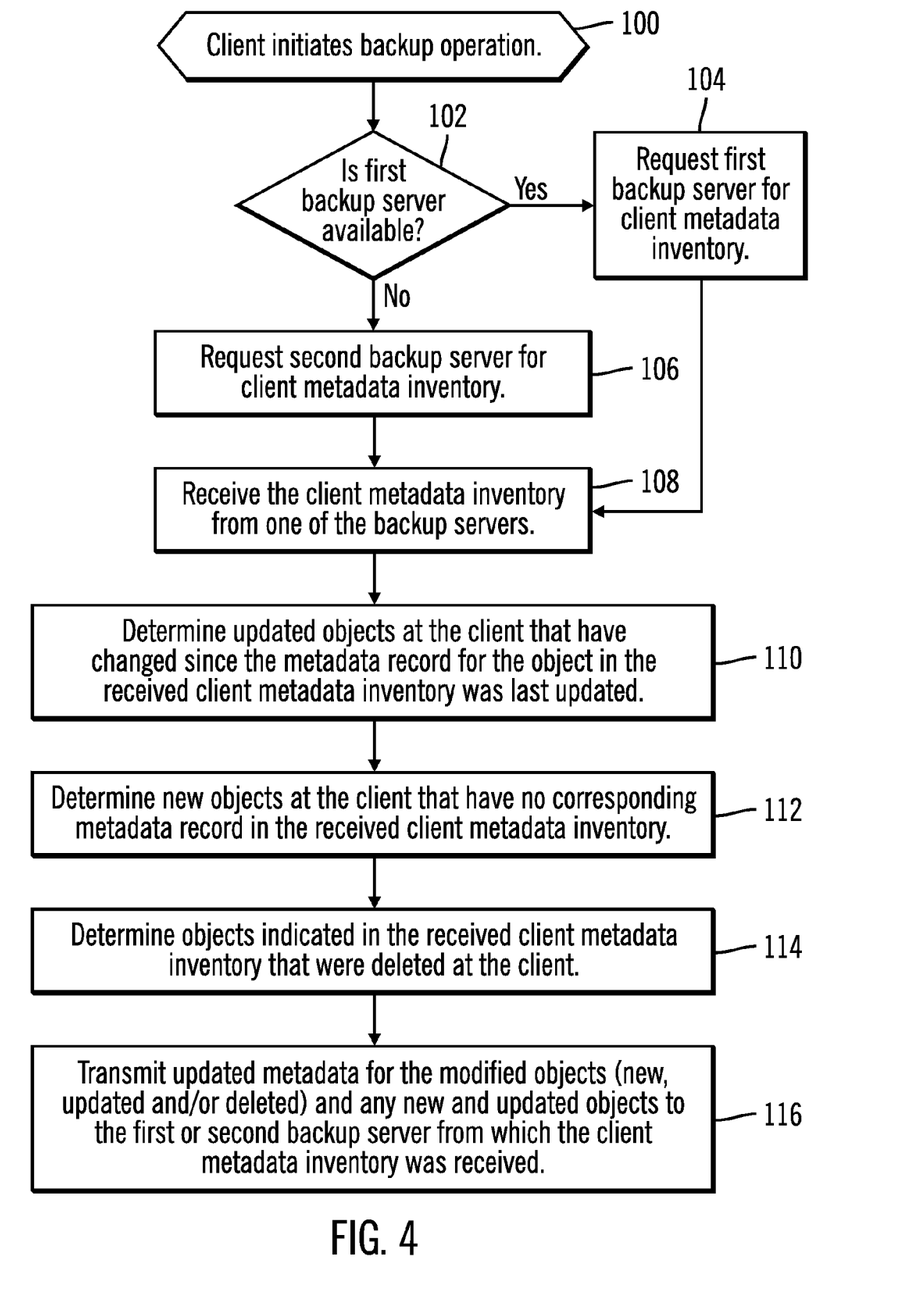
FIG. 4 illustrates an embodiment of operations for a client to backup client objects.

FIG. 4 illustrates an embodiment of operations performed by the backup client 10 to backup client objects 8 at the backup servers 18a, 18b. Upon initiating a backup operation (at block 100), which may occur periodically or in response to an event, the backup client 10 determines (at block 102) whether the first or primary backup server 18a is available. If so, the backup client 10 requests (at block 104) the first backup server 18a for the client metadata inventory 20a at the first backup server 18a. If (at block 104) the first backup server 18a is unavailable, then backup client 10 requests (at block 106) the second backup server 18b for the second backup client metadata inventory 20b. In response to the request at block 104 or 106, the backup client 10 receives (at block 108) the metadata inventory 20a, 20b from one of the backup servers 18a, 18b. The backup client 10 determines (at block 110) updated objects 8 at the client 2 that have changed since the metadata record 50 for the object in the received metadata inventory 20a, 20b was last updated. The backup client 10 further determines (at block 112) new objects at the client 2 that have no corresponding metadata record in the received metadata inventory 20a, 20b. The backup client 10 also determines (at block 114) objects 8 indicated in the received metadata inventory 20a, 20b that were deleted at the client 2. The backup client 10 transmits (at block 116) updated metadata records 50 for the modified objects (new, updated and/or deleted) and any new and updated objects 8 to the first 18a or second 18b backup server from which the metadata inventory 20a, 20b was received.

Figure 5:
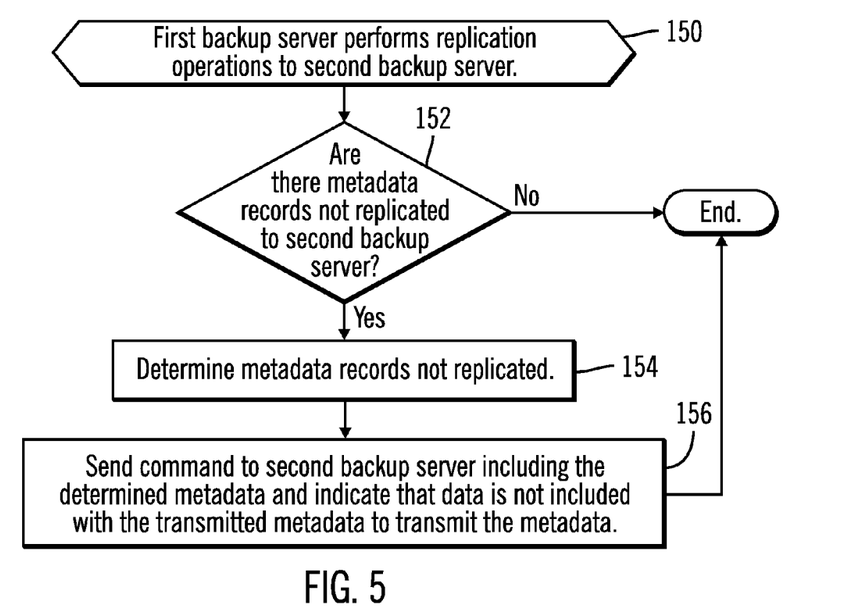
FIG. 5 illustrates an embodiment of operations for a first backup server to replicate metadata on client objects to a second backup server.

FIG. 5 illustrates an embodiment of operations performed by the first backup server 18a to replicate client metadata inventory 12 to the second backup server 18b as part of a synchronization between the backup servers 18a, 18b. Replication may be performed periodically or in response to receiving backup objects from the client 10. Upon initiating (at block 150) replication operations, the first backup server 18a determines (at block 152) whether there are any client metadata records 50 in the client metadata 20a not replicated to the second backup server 18b. If not, control ends. If there are metadata records 50 to replicate from the first backup server client metadata inventory 20a, then the first backup server 18a determines (at block 154) client metadata records 50 not replicated. A command 70 is sent (at block 156) to the second backup server 18b including the determined metadata records 50 and indication in the metadata only flag 76 that no data objects are provided with the replication command 70.

Figure 6:
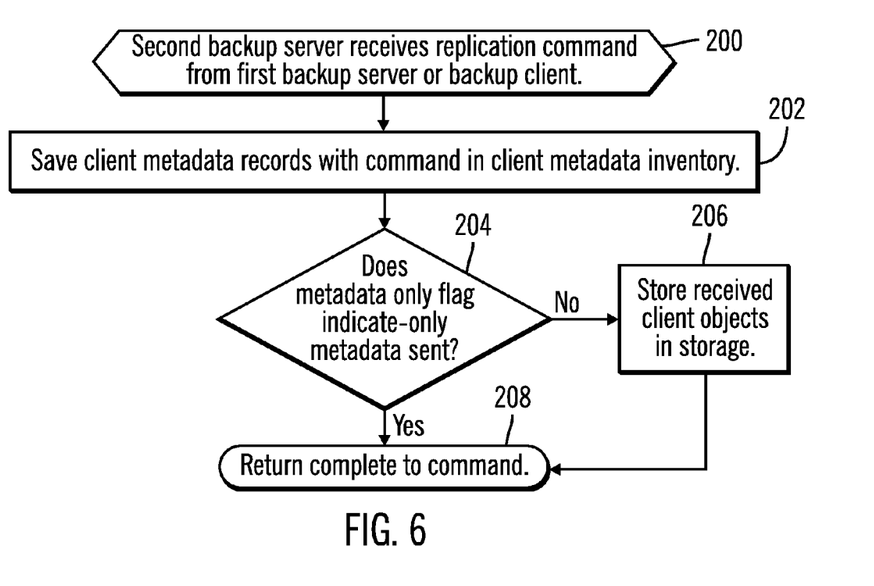
FIG. 6 illustrates an embodiment of operations for the second backup server to process replication commands.

FIG. 6 illustrates an embodiment of operations performed by the second backup server 18b in response to receiving a replication command 70 from the first backup server 18a. Upon receiving (at block 200) the replication command 70, the second backup server 18b saves (at block 202) client metadata records 74 provided with the command 70 in the client metadata inventory 20b. If (at block 204) the metadata-only flag 76 indicates that new or modified data objects are included, then the received client objects are stored (at block 206) in the second storage 22b. If (from the yes branch of block 204) the metadata-only flag 76 indicates that only metadata is sent or after storing the client objects (at block 206), the second backup server 18b returns (at block 208) complete to the command 70.

Figure 7:
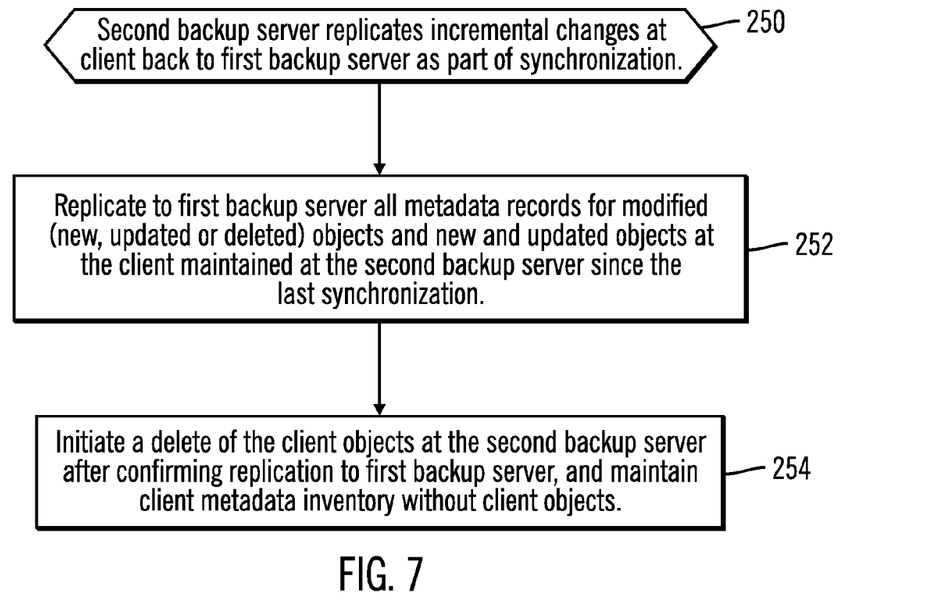
FIG. 7 illustrates an embodiment of operations for the second backup server to replicate client objects and metadata to the first backup server.

FIG. 7 illustrates an embodiment of operations performed by the second backup server 18b to replicate incremental client changes to the first backup server 18a as part of the synchronization, which would also trigger the operations of FIG. 5 for the replication from the first backup server 18a to the second backup server 18b. If the first backup server 18a has been unavailable for a period of time during which the client 10 was backing up incremental changes to the second backup server 18b, then the synchronization following the first backup server 18a becoming available would result in the second backup server 18b replicating the changes to the objects and the metadata to the first backup server 18a. In response to the second backup server 18b initiating replication (at block 250) during synchronization, the second backup server 18b replicates (at block 252) to the first backup server 18b all metadata records 50 from the second backup server client metadata inventory 20a for modified (new, updated or deleted) objects and new and updated objects at the client maintained at the second backup server 18b since the last synchronization, which may include new and updated objects from the client that were sent to the second backup server 18b while the first backup server 18a was unavailable. If the second backup server 18b transmits metadata records 50 indicating that the object has expired in the expiration rule field 58, then the first backup server 18a may delete the object 54 identified as expired in the metadata record 50 when processing the metadata records. The second backup server 18b may replicate using the replication command 70 described with respect to FIG. 3, including metadata records 74 and objects 78 and set the metadata only flag 76 to indicate that this replication is not metadata only. After the client metadata and new and/or modified objects are replicated, the second backup server 18b initiates a delete (at block 254) of the client objects 8b at the second storage 22b after confirming replication to the first backup server 18a. The second backup server 18b maintains the client metadata inventory 20b without the client objects 8.

Described embodiments provide techniques for replicating metadata-only from a first backup server to a second backup server, so that the first backup server maintains backed-up client objects and a client metadata inventory on the backed-up client objects while the second backup server maintains only client object metadata. This conserves bandwidth by having the first backup server only replicate metadata and not the client objects. If the first backup server becomes unavailable, then the client will backup new and added objects and metadata for object modifications (deletions, changes and additions) to the second backup server to maintain. When the first backup server becomes available again, then the second backup server copies any received client metadata and objects to the first backup server to store.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The backup client 10 and backup servers 18a, 18b may be implemented as one or more program modules in the client computer 2 and backup servers 16a, 16b, respectively. The client computer 2 and backup servers 16a, 16b may comprise computer systems, such as the computer system 302 shown in FIG. 8. Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

Figure 8:
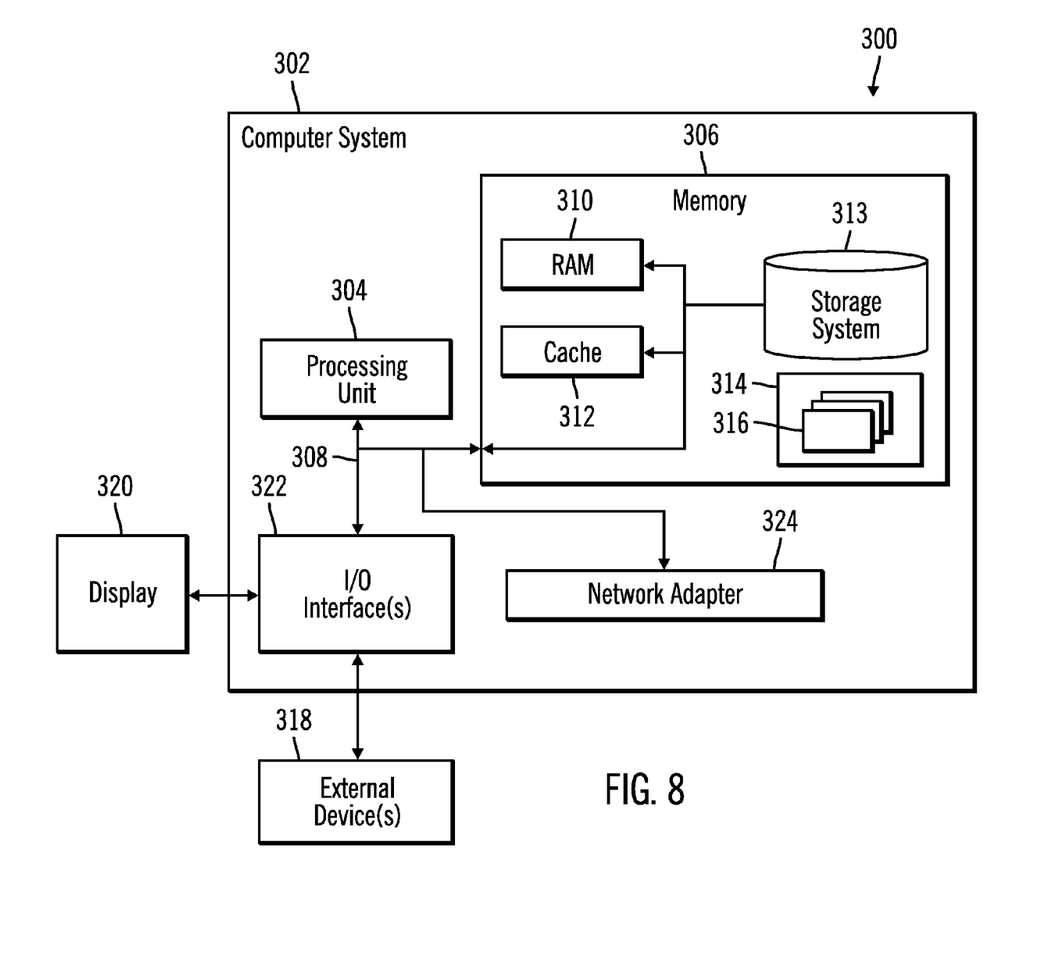
FIG. 8 illustrates an embodiment of a computing environment.

As shown in FIG. 8, the computer system/server 302 is shown in the form of a general-purpose computing device.

The components of computer system/server 302 may include, but are not limited to, one or more processors or processing units 304, a system memory 306, and a bus 308 that couples various system components including system memory 306 to processor 304. Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. The backup client 10 and backup servers 18a, 18b may be implemented as program modules 316 which generally carry out the functions and/or methodologies of embodiments of the invention as described herein.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for backing up objects from a client to a first backup server and a second backup server, wherein the computer program product comprises a computer readable storage medium having computer readable program code embodied therein that executes to perform operations, the operations comprising:
    backing-up objects from a client to the first backup server;
    generating, by the first backup server, metadata on the objects from the client;
    transmitting as part of a metadata-only replication command, by the first backup server, the metadata to the second backup server, wherein the objects represented by the transmitted metadata backed-up at the first backup server are not copied to the second backup server as part of the metadata-only replication command, and wherein while the objects are backed up to the first backup server, the second backup server maintains only client object metadata of the objects backed-up to the first backup server from the client;
    determining that the first backup server is unavailable after transmitting the metadata as part of the metadata-only replication operation;
    using the metadata at the second backup server to determine modifications to the objects at the client since the metadata was last generated in response to determining that the first backup server is unavailable; and
    backing-up, by the client, the determined modifications to the objects to the second backup server to backup.

2. The computer program product of claim 1, wherein the operations further comprise:
    determining that the first backup server has become available after being determined to be unavailable; and
    transmitting, by the second backup server, the modifications to the objects to the first backup server in response to determining that the first backup server has become available.

3. The computer program product of claim 2, wherein the modifications at the second backup server and transmitted to the first backup server indicate objects that have been deleted at the client, wherein the transmitting the modifications to the first backup server causes the first backup server to initiate a delete of the objects that are indicated to have been deleted at the client.

4. The computer program product of claim 2, wherein the determined modifications transmitted to the first backup server include a metadata record for each object indicating a timestamp the object at the client was changed and an expiration field indicating whether the object has expired, wherein the metadata record for the object that has been deleted indicates in the expiration field that the object has expired, wherein the first backup server deletes the object that is indicated to have been expired in response to receiving the transmitted metadata records indicating the modifications to the objects.

5. The computer program product of claim 2, wherein the operations further comprise:
using, by the client, the metadata at the first backup server to determine modifications to the objects at the client to backup to the first backup server after the first backup server has become available after being determined to be unavailable.

6. The computer program product of claim 2, wherein the transmitting the modifications backed-up at the second backup server to the first backup server comprises transmitting objects that changed and/or were added at the client since the first backup server became unavailable and transmitting metadata on the objects that have changed and/or were added.

7. The computer program product of claim 6, wherein the operations further comprise:
initiating, at the second backup server, a delete of the objects that were changed and/or were added at the client in response to transmitting the objects to the first backup server.

8. The computer program product of claim 1, wherein the using the metadata to determine the modifications comprises:
determining, from the metadata, objects that have changed since the metadata was last updated, wherein the transmitting the determined modifications comprises transmitting the objects that have changed; and
determining, from the metadata, objects that were added to the client since the metadata was last updated, wherein the transmitting the determined modifications comprises transmitting the objects that were added to the client since the metadata was last updated.

9. The computer program product of claim 1, wherein the determined modifications include updated metadata indicating changes to the objects at the client since the metadata was last updated.

10. A system for backing up objects from a client implemented in at least one computing device, comprising:
a first backup server;
a second backup server;
a client;
wherein the first backup server performs operations, the operations comprising:
backing-up objects from the client;
generating metadata on the objects from the client;
transmitting as part of a metadata-only replication command the metadata to the second backup server, wherein the objects represented by the transmitted metadata backed-up at the first backup server are not copied to the second backup server as part of the metadata-only replication command, and wherein while the objects are backed up to the first backup server, the second backup server maintains only client object metadata of the objects backed-up to the first backup server from the client;
wherein the client performs operations, the operations comprising:
determining that the first backup server is unavailable after transmitting the metadata as part of the metadata-only replication operation;
using the metadata at the second backup server to determine modifications to the objects at the client since the metadata was last generated in response to determining that the first backup server is unavailable; and
backing-up the determined modifications to the objects to the second backup server to backup.

11. The system of claim 10, wherein the second backup server performs operations, the operations comprising:
determining that the first backup server has become available after being determined to be unavailable; and
transmitting the modifications to the objects to the first backup server in response to determining that the first backup server has become available.

12. The system of claim 11, wherein the modifications at the second backup server and transmitted to the first backup server indicate objects that have been deleted at the client, wherein the transmitting the modifications to the first backup server causes the first backup server to initiate a delete of the objects that are indicated to have been deleted at the client.

13. The system of claim 11, wherein the determined modifications transmitted to the first backup server include a metadata record for each object indicating a timestamp the object at the client was changed and an expiration field indicating whether the object has expired, wherein the metadata record for the object that has been deleted indicates in the expiration field that the object has expired, wherein the first backup server deletes the object that is indicated to have been expired in response to receiving the transmitted metadata records indicating the modifications to the objects.

14. The system of claim 11, wherein the transmitting the modifications backed-up at the second backup server to the first backup server comprises transmitting objects that changed and/or were added at the client since the first backup server became unavailable and transmitting metadata on the objects that have changed and/or were added.

15. The system of claim 14, wherein the second backup server further performs operations comprising:
initiating, at the second backup server, a delete of the objects that were changed and/or were added at the client in response to transmitting the objects to the first backup server.

16. A method for backing up objects, comprising:
backing-up objects from a client to a first backup server;
generating, by the first backup server, metadata on the objects from the client;
transmitting, as part of a metadata-only replication command, by the first backup server, the metadata to a second backup server, wherein the objects represented by the transmitted metadata backed-up at the first backup server are not copied to the second backup server as part of the metadata-only replication command, and wherein while the objects are backed up to the first backup server, the second backup server maintains only client object metadata of the objects backed-up to the first backup server from the client;
determining that the first backup server is unavailable after transmitting the metadata as part of the metadata-only replication operation;
using the metadata at the second backup server to determine modifications to the objects at the client since the metadata was last generated in response to determining that the first backup server is unavailable; and
backing-up, by the client, the determined modifications to the objects to the second backup server to backup.

17. The method of claim 16, further comprising:
determining that the first backup server has become available after being determined to be unavailable; and
transmitting, by the second backup server, the modifications to the objects to the first backup server in response to determining that the first backup server has become available.

18. The method of claim 17, wherein the modifications at the second backup server and transmitted to the first backup server indicate objects that have been deleted at the client, wherein the transmitting the modifications to the first backup server causes the first backup server to initiate a delete of the objects that are indicated to have been deleted at the client.

19. The method of claim 17, wherein the determined modifications transmitted to the first backup server include a metadata record for each object indicating a timestamp the object at the client was changed and an expiration field indicating whether the object has expired, wherein the metadata record for the object that has been deleted indicates in the expiration field that the object has expired, wherein the first backup server deletes the object that is indicated to have been expired in response to receiving the transmitted metadata records indicating the modifications to the objects.

20. The method of claim 17, wherein the transmitting the modifications backed-up at the second backup server to the first backup server comprises transmitting objects that changed and/or were added at the client since the first backup server became unavailable and transmitting metadata on the objects that have changed and/or were added.

\* \* \* \* \*